United States Patent
Arase

(10) Patent No.: US 7,143,423 B2
(45) Date of Patent: Nov. 28, 2006

(54) DISLOCATION PREVENTING APPARATUS IN DISK PLAYER

(75) Inventor: Hiroyuki Arase, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 11/095,485

(22) Filed: Apr. 1, 2005

(65) Prior Publication Data

US 2005/0223397 A1 Oct. 6, 2005

(30) Foreign Application Priority Data

Apr. 5, 2004 (JP) ............................. 2004-110953

(51) Int. Cl.
*G11B 17/04* (2006.01)
(52) U.S. Cl. ...................... 720/613; 720/602; 720/610
(58) Field of Classification Search ................ 720/601, 720/602, 606, 610, 611, 613, 637, 639, 641; 369/77.11
See application file for complete search history.

(56) References Cited

U.S. PATENT DOCUMENTS 5,732,064 A * 3/1998 Huang ........................ 720/611
6,009,060 A * 12/1999 Kim ............................. 720/611
2004/0244017 A1* 12/2004 Hisatomi ..................... 720/601

FOREIGN PATENT DOCUMENTS

JP 9-282762 10/1997

* cited by examiner

*Primary Examiner*—Andrea Wellington
*Assistant Examiner*—Nathan Danielsen
(74) *Attorney, Agent, or Firm*—Morgan, Lewis & Bockius LLP

(57) ABSTRACT

A disk player includes: a housing; a motor disposed in the housing; a disk tray having a projecting piece at a rear end on each side edge thereof; and dislocation preventive pieces disposed at a front end side of the housing and projecting from the housing so as to respectively face the projecting pieces. An elastic plate and a stopper surface adapted to face a distal end of the elastic plate are formed on each of the projecting pieces and each of the dislocation preventive pieces or either on each of the projecting pieces or each of the dislocation preventive pieces. When the tray is moved forward, the elastic plate is brought into contact with the projecting piece or the dislocation preventive piece and is displaced elastically to thereby apply the brakes to stop the disk tray that is moving forward.

1 Claim, 10 Drawing Sheets

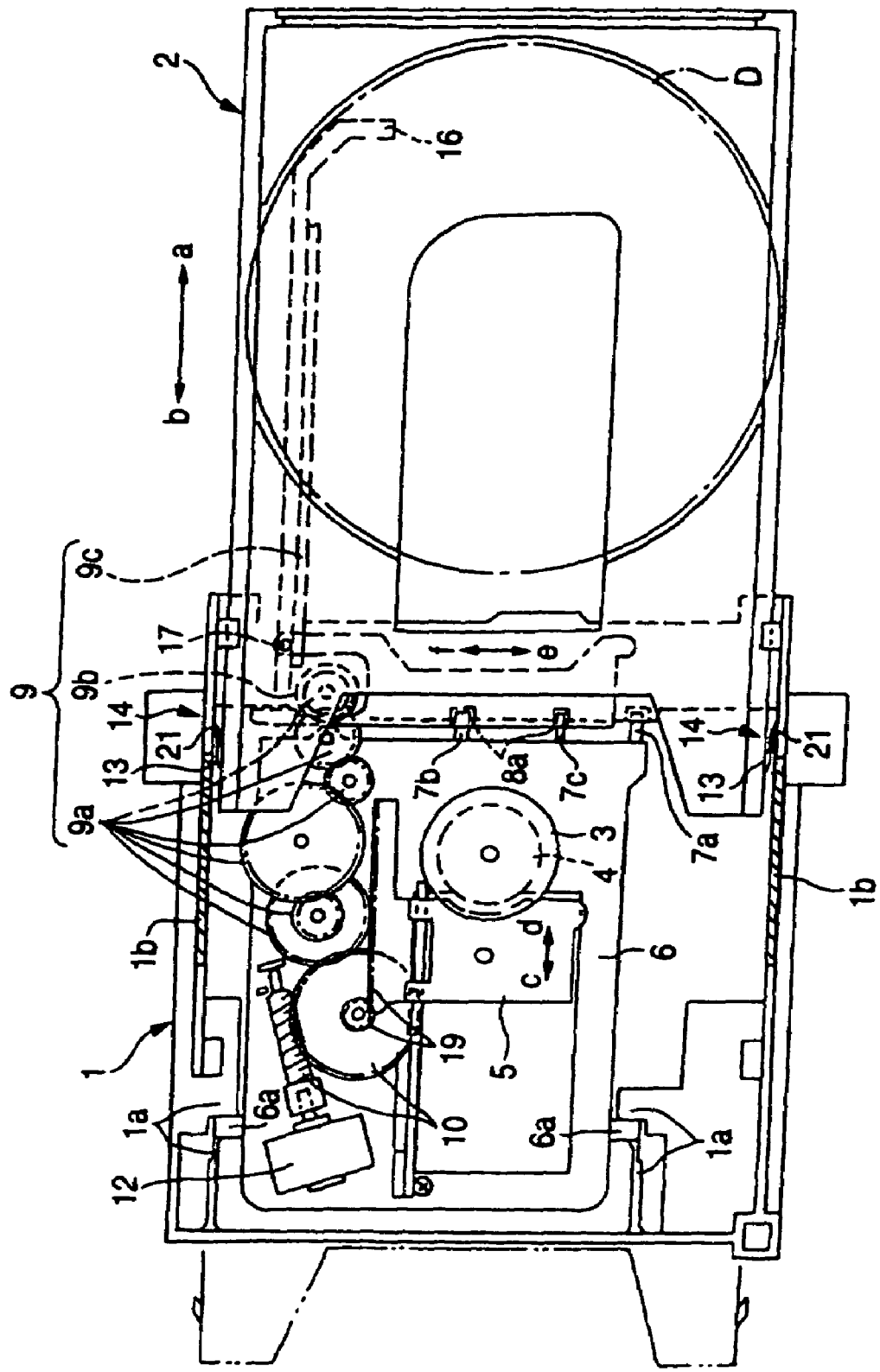

DISLOCATION PREVENTING APPARATUS IN DISK PLAYER

BACKGROUND OF THE INVENTION

1. Field of the Invention

The present invention relates to a disk player for implementing reproduction and storage or deletion of data on optical disks and magnetic disks (hereinafter, referred generally to as a disk) such as read and write DVDs.

2. Description of the Related Art

Conventionally, as an example of disk players, there is one as shown in FIGS. 7 and 8. In this disk player, a disk D installation synthetic resin tray 2 is disposed in a synthetic resin housing 1 in such a manner as to be moved forward and backward a, b. A pair of left and right pivot shafts 6a, which are provided at a distal end portion of a drive chassis 6 on which a spindle motor 4 having a turntable 3 and an optical pickup 5 adapted to move in directions indicated by arrows c, d are installed in such a manner as to protrude from the distal end portion, are fitted in bearings 1a provided at the rear of the housing 1, and a pair of stationary camshafts 7a, 7b and a movable camshaft 7c, which are provided on a distal end of the drive chassis 6 in such a manner as to protrude therefrom, are fitted in cam holes 8a in a cam plate 8 disposed at the front of the housing in such a manner as to slide in left and right transverse directions e, f which intersect at right angles with the forward and backward longitudinal directions (a), (b), thereby the drive chassis 6 is incorporated in the housing in such a manner as to move vertically about the pivot shafts 6a.

A feed motor 12 is provided for selectively driving the tray 2, the drive chassis 6 and the optical pickup 5 via a gear mechanism 9 and a worm mechanism 10, and a guide pin 17 provided on the cam plate 8 in such a manner as to protrude therefrom is fitted in a substantially L-shaped guide groove 16 formed in a back side of the tray 2. Note that reference numeral 18 denotes a holder with a magnet disposed on a top plate portion 1c of the housing 1.

In the construction described above, in a play mode, as shown by temporary lines in FIGS. 7 and 8, the tray 2 moves backward to be accommodated in the housing 1, and the drive chassis 6 moves upwardly g. A disk D is placed on the turntable 3, and the disk D is rotated at high speeds by the spindle motor 4 via the turntable 3, and the optical pickup 5 is moved in the directions indicated by the arrows c, d by the feed motor 12 via the worm mechanism 10 and a pinion/rack 19, whereby information stored in the disk D is read.

When the play mode is changed over to an eject mode, the cam plate 8 is caused to slide in the direction indicated by the arrow f by the feed motor 12 via the gear mechanism 9, and after the drive chassis 6 is moved downwardly about the pivot shafts 6a, the tray 2 is moved forward by the feed motor 12 via a group of gears 9a, a pinion 9b and a rack 9c of the gear mechanism 9. When the tray 2 is moved to its front-most position a (refer to FIGS. 7 and 8), the cam plate 8 is pushed in the direction indicated by the arrow f by an inclined surface 16a of the guide groove 16 via the guide pin 17, whereby a tray detector 15 is switched on by a hold-down piece 8b, and the feed motor 12 is stopped to drive based on a detection signal of the tray detector 15.

As shown in FIGS. 7, 9A and 9B, a projecting piece 13 is provided at a rear end of each side edge of the tray 2 in such a manner as to project from the rear end, and a dislocation preventive piece 14 is provided at a front end of each side wall portion 1b of the housing 1 in such a manner as to face the projecting piece 13, whereby when attempting to forcibly dislocate the tray 2 forward (a) from the housing 1, each projecting piece 13 is brought into abutment with each dislocation preventive piece 14 to thereby prevent the removal of the tray 2 from the housing 1. Then, when attempting to stop the tray 2 at its front-most position a based on a detection signal from the tray detector 15 as has been described above, each projecting piece 13 is only allowed to approach each dislocation preventive piece 14 with a slight gap a being provided therebetween, whereby there is no risk that each projecting piece 13 comes into collision with each dislocation preventive piece 14.

JP-A-9-282762 discloses a conventional disk player.

SUMMARY OF THE INVENTION

In the conventional construction, the movement of the tray 2 to its front-most position a is detected by the tray detector 15 to thereby stop the driving of the feed motor 12, and this requires a relatively large number of components including the tray detector 15 and a printed circuit board and lead wires which control the tray detector 15, resulting in high production costs.

To cope with this, it is considered that the tray detector 15 is omitted, and the feed motor 12 is driven only for a certain period of time (for example, 2 to 5 seconds) through timer control so as to move the tray 2 forward (a), so that, as shown in FIG. 9C, when the tray 2 arrives at its front-most position a, an end face 13a of the projecting piece 13 is brought into abutment with an end face 14a of the dislocation preventive piece 14 so as to prevent the tray 2 from moving forward (a) further.

However, in this construction, a relatively large collision noise is generated when the end faces 13a, 14a are brought into abutment with each other, giving an uncomfortable feeling to the user, and an excessively large load is applied to the driving system such as the feed motor 12, and this may result in a risk that the load so applied constitutes a cause for failure.

The invention was made in view of the problems inherent in the conventional disk player, and an object thereof is to provide a disk player which is inexpensive and which can prevent the generation of uncomfortable collision noise and excessively large load.

With a view to attaining the object, according to a first aspect of the invention, there is provided a disk player including: a housing; a motor disposed in the housing; a disk tray being movable forward and backward by the motor, the disk tray having a projecting piece at a rear end on each side edge thereof, each of the projecting pieces having an inclined guide surface on a front end face thereof in such a manner as to incline backward so as to approach to the disk tray, and a stopper surface formed between a backward end of the inclined guide surface and the disk tray; and dislocation preventive pieces disposed at a front end side of the housing and projecting from the housing so as to respectively face the projecting pieces, each of the dislocation preventive piece having an elastic plate being elastically displacable and extending backward diagonally so as to approach to the disk tray; wherein when the motor is driven for a certain period of time through timer control to move forward the disk tray accommodated in the housing, the inclined guide surface on each of the projecting pieces is brought into contact with a distal end of the elastic plate of each of the dislocation preventive pieces so as to displace elastically the elastic plate along the inclined guide surface to thereby apply the brakes to stop the disk tray that is moving forward and then the stopper surface on each of the projecting pieces is brought into abutment with the distal end of the elastic plate of each of the dislocation preventive pieces to thereby stop the disk tray at its front-most position.

According to a second aspect of the invention, there is provided a disk player including: a housing; a motor disposed in the housing; a disk tray being movable forward and backward by the motor, the disk tray having a projecting piece at a rear end on each side edge thereof, each of the projecting pieces having an elastic plate being elastically displaceable; dislocation preventive pieces disposed at a front end side of the housing and projecting from the housing so as to respectively face the projecting pieces, each of the dislocation preventive piece having an elastic plate being elastically displacable; and a stopper surface formed on at least one of between a root of the elastic plate of the projecting piece and the disk tray and between a root of the elastic plate of the dislocation preventive piece and the housing; wherein when the motor is driven for a certain period of time through timer control to move forward the disk tray accommodated in the housing, the elastic plates of both the projecting pieces and the dislocation preventive pieces are brought into abutment with each other so that the corresponding elastic plates are elastically displaced by each other to thereby apply the brakes to stop the disk tray that is moving forward and then the stopper surface is brought into abutment with a distal end of the elastic plate to thereby stop the disk tray at its front-most position.

According to a third aspect of the invention, there is provided a disk player including: a housing; a motor disposed in the housing; a disk tray being movable forward and backward by the motor, the disk tray having a projecting piece at a rear end on each side edge thereof, each of the projecting pieces having an inclined guide surface formed on a front end thereof in such a manner as to incline forward so as to approach to the disk tray, and a stopper surface formed on a side of the projecting piece in such a manner as to extend sideways; dislocation preventive pieces disposed at a front end side of the housing and projecting from the housing so as to respectively face the projecting pieces, each of the dislocation preventive piece having an elastic plate being elastically displacable and extending backward diagonally so as to approach to the disk tray; wherein when the motor is driven for a certain period of time through timer control to move forward the disk tray accommodated in the housing, the inclined guide surface on each of the projecting pieces is brought into contact with a distal end of the elastic plate of each of the dislocation preventive pieces so as to displace elastically the elastic plate along the inclined guide surface to thereby apply the brakes to stop the disk tray that is moving forward and then the stopper surfaces are brought into abutment with the distal ends of the elastic plates, respectively, to thereby stop the disk tray at its front-most position.

According to a fourth aspect of the invention, there is provided a disk player including: a housing; a motor disposed in the housing; a disk tray being movable forward and backward by the motor, the disk tray having a projecting piece at a rear end on each side edge thereof, each of the projecting pieces having an elastic plate being elastically displacable and extending forward, the elastic plate having an inclined guide surface formed on a front end thereof in such a manner as to incline forward so as to approach to the disk tray, and a stopper surface formed on a side of the elastic plate in such a manner as to extend sideways; and dislocation preventive pieces disposed at a front end side of the housing and projecting from the housing so as to respectively face the projecting pieces, each of the dislocation preventive piece having an elastic plate being elastically displaceable and extending backward diagonally so as to approach to the disk tray; wherein when the motor is driven for a certain period of time through timer control to move forward the tray accommodated in the housing, the inclined guide surface on the elastic plate of each of the projecting pieces is brought into contact with a distal end of the elastic plate of each of the dislocation preventive pieces so that the corresponding elastic plates are elastically displaced to thereby apply the brakes to stop the tray that is moving forward and then the stopper surface on each of the projecting pieces is brought into abutment with the distal end of the elastic plate of each of the dislocation preventive pieces to thereby stop the disk tray at its front-most position.

According to a fifth aspect of the invention, there is provided a disk player including: a housing; a motor disposed in the housing; a disk tray being movable forward and backward by the motor, the disk tray having a projecting piece at a rear end on each side edge thereof, each of the projecting pieces having an elastic plate being elastically displacable and extending forward, the elastic plate having an inclined guide surface formed on a front end thereof in such a manner as to incline forward so as to approach to the disk tray, and a stopper surface formed on a side of the elastic plate in such a manner as to extend sideways; and dislocation preventive pieces disposed at a front end side of the housing and projecting from the housing so as to respectively face the projecting pieces; wherein when the motor is driven for a certain period of time through timer control to move forward the tray accommodated in the housing, the inclined guide surface on the elastic plate of each of the projecting pieces is brought into contact with each of the dislocation preventive pieces so as to displace elastically the elastic plate to thereby apply the brakes to stop the tray that is moving forward and then the stopper surface on each of the projecting pieces is brought into abutment with each of the dislocation preventive pieces to thereby stop the disk tray at its front-most position.

According to a sixth aspect of the invention, there is provided a disk player including: a housing; a motor disposed in the housing; a disk tray having a projecting piece at a rear end on each side edge thereof; and dislocation preventive pieces disposed at a front end side of the housing and projecting from the housing so as to respectively face the projecting pieces;

wherein an elastic plate and a stopper surface adapted to face a distal end of the elastic plate are formed on each of the projecting pieces and each of the dislocation preventive pieces or either on each of the projecting pieces or each of the dislocation preventive pieces, whereby when the tray is moved forward, the elastic plate is brought into contact with the projecting piece or the dislocation preventive piece that faces the elastic plate so as to be displaced elastically to thereby apply the brakes to stop the disk tray that is moving forward and then the stopper surfaces are brought into abutment with the distal end of the elastic plate to thereby stop the disk tray at its front-most position.

The invention set forth in the first aspect is such as to correspond to a first embodiment (refer to FIGS. 1 and 2) of the invention, and according to the invention so set forth, the motor is designed to be driven only for the certain period of time through timer control so as to drive the tray forward and this configuration obviates the necessity of the conventional components such as the tray detector and the printed circuit board and lead wires which are necessary to control the tray detector, resulting in low production costs.

Since just before the tray stops at its front-most position, the inclined guide surface on each projecting piece is brought into contact with the elastic plate on each dislocation preventive piece, so that the elastic plate is displaced elastically along the inclined guide surface to thereby apply brakes on the tray which is moving forward, the impact due to the contact is dampened to reduce the contact noise, and therefore, there is generated no conventional uncomfortable collision noise and the problematic occurrence of a failure due to the excessively large load being applied to the driving system such as the motor can be resolved.

In addition, the tray can be stopped at its front-most position in the predetermined way by allowing the stopper surface formed between the inclined guide surface and the deeper end of the tray to be brought into abutment with the distal end of the elastic plate.

Here, in particular, since the inclined guide surface is inclined rearward so as to approach the tray side and the distal end of the elastic plate bites into a substantially V-shaped recessed portion formed between the inclined guide surface and the tray, it is ensured that the tray can be stopped at its front-most position.

The invention set forth in the second aspect is such as to correspond to a second embodiment (refer to FIG. 3) of the invention, and according to the invention so set forth, a function and advantage similar to those obtained by the invention set forth in the first aspect can be obtained. In particular, since by allowing the distal ends of the elastic plates which make up the projecting piece and the dislocation preventive piece, respectively, to be brought into contact with each other, the elastic plates are elastically displaced by each other, the impact resulting from the contact of the elastic plates can be dampened more effectively so as to reduce the contact noise to an extremely low level. In addition, the distal end of the elastic plate on the dislocation preventive piece side bites into a substantially V-shaped recessed portion formed between the projecting piece side elastic plate and the tray, it is ensured that the tray can be stopped at its front-most position.

The invention set forth in the third aspect is such as to correspond to a third embodiment (refer to FIG. 4) of the invention, and according to the invention so set forth, a function and advantage similar to those obtained by the invention set forth in the first aspect can be obtained. In particular, the elastic plate on each dislocation preventive piece is forced to expand by the inclined guide surface formed on the elastic plate on each projecting piece so that the respective elastic plates are displaced elastically by each other, whereby the brakes can be applied to the tray which is moving forward in an ensured fashion by virtue of elastic force generated by the elastic displacement.

The invention set forth in the fourth aspect is such as to correspond to a fourth embodiment (refer to FIG. 5) of the invention, and according to the invention so set forth, a function and advantage similar to those obtained by the invention set forth in the first aspect can be obtained. In particular, the elastic plate on each dislocation preventive piece is forced to separate by the inclined guide surface formed on the elastic plate on each projecting piece to thereby apply the brakes to stop the tray which is moving forward. In addition, since the elastic plates on both the projecting piece and the dislocation preventive piece are displaced elastically by each other, the impact resulting the contact of the elastic plates can be dampened more effectively, so that the contact noise can be reduced to an extremely low level.

The invention set forth in the fifth aspect is such as to correspond to a fifth embodiment (refer to FIG. 6) of the invention, and according to the invention so set forth, a function and advantage similar to those obtained by the invention set forth in the first aspect can be obtained. In particular, the inclined guide surface formed on the elastic plate on each projecting piece is forced into between the dislocation preventive pieces so as to displace the elastic plate elastically to thereby apply the brakes to stop the tray which is moving forward in an ensured fashion by virtue of elastic force generated by the elastic displacement of the elastic plate.

The invention set forth in the sixth aspect is such as to illustrate a basic form of a disk player, and according thereto, the motor is designed to be driven only for the certain period of time through timer control to drive the tray forward, which obviates the necessity of the conventional components such as the tray detector and the printed circuit board and lead wires which are necessary to control the tray detector, resulting in low production costs.

Since just before the tray stops at its front-most position, the elastic plate and the projecting piece or the dislocation preventive piece which faces the elastic plate are brought into contact with each other so as to displace the elastic plate elastically to thereby apply the brakes to stop the tray which is moving, the impact resulting from the contact is dampened to reduce the contact noise, and therefore, there is no risk that the conventional uncomfortable collision noise is generated, and the problematic occurrence of a failure due to the excessively large load being applied to the driving system such as the motor can be resolved. In addition, by allowing the stopper surface to be brought into abutment with the distal end of the elastic plate, the tray can be stopped at its front-most position in the predetermined way.

BRIEF DESCRIPTION OF THE DRAWINGS

FIG. 1 is a schematic plan view of a disk player according o a first embodiment of the invention;

DETAILED DESCRIPTION OF THE PREFFERED EMBODIMENTS

Figure 2A:
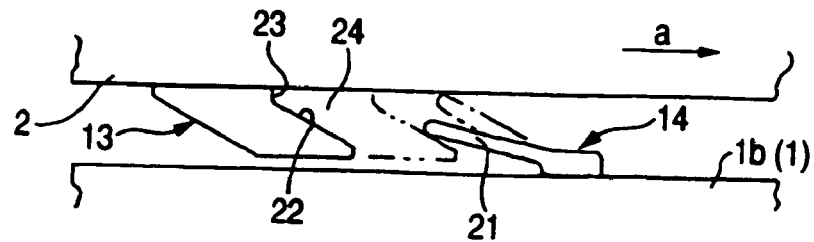
FIG. 2A is a plan view of a main part in a state where tray is moving forward.
Figure 2B:
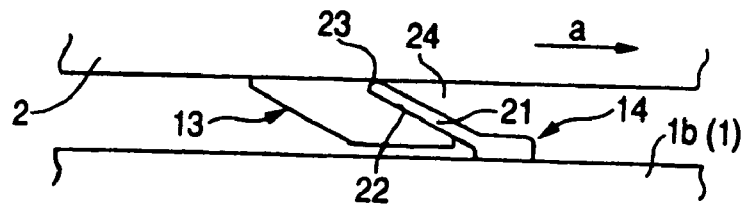
FIG. 2B is a plan view of the main part in a state where the tray is at its front-most position.
Figure 2C:
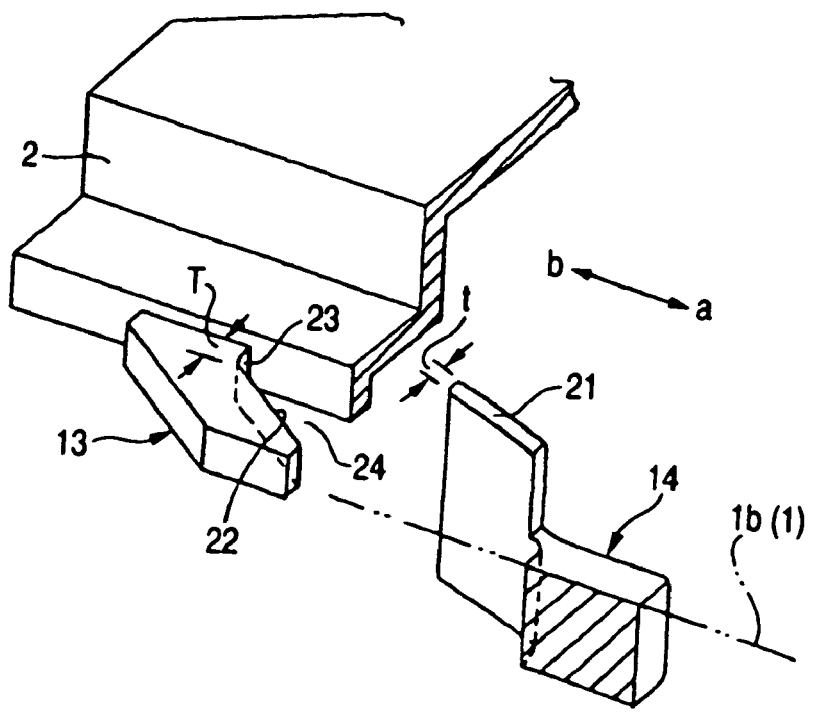
FIG. 2C is an exploded perspective view of the main part.
Figure 7:
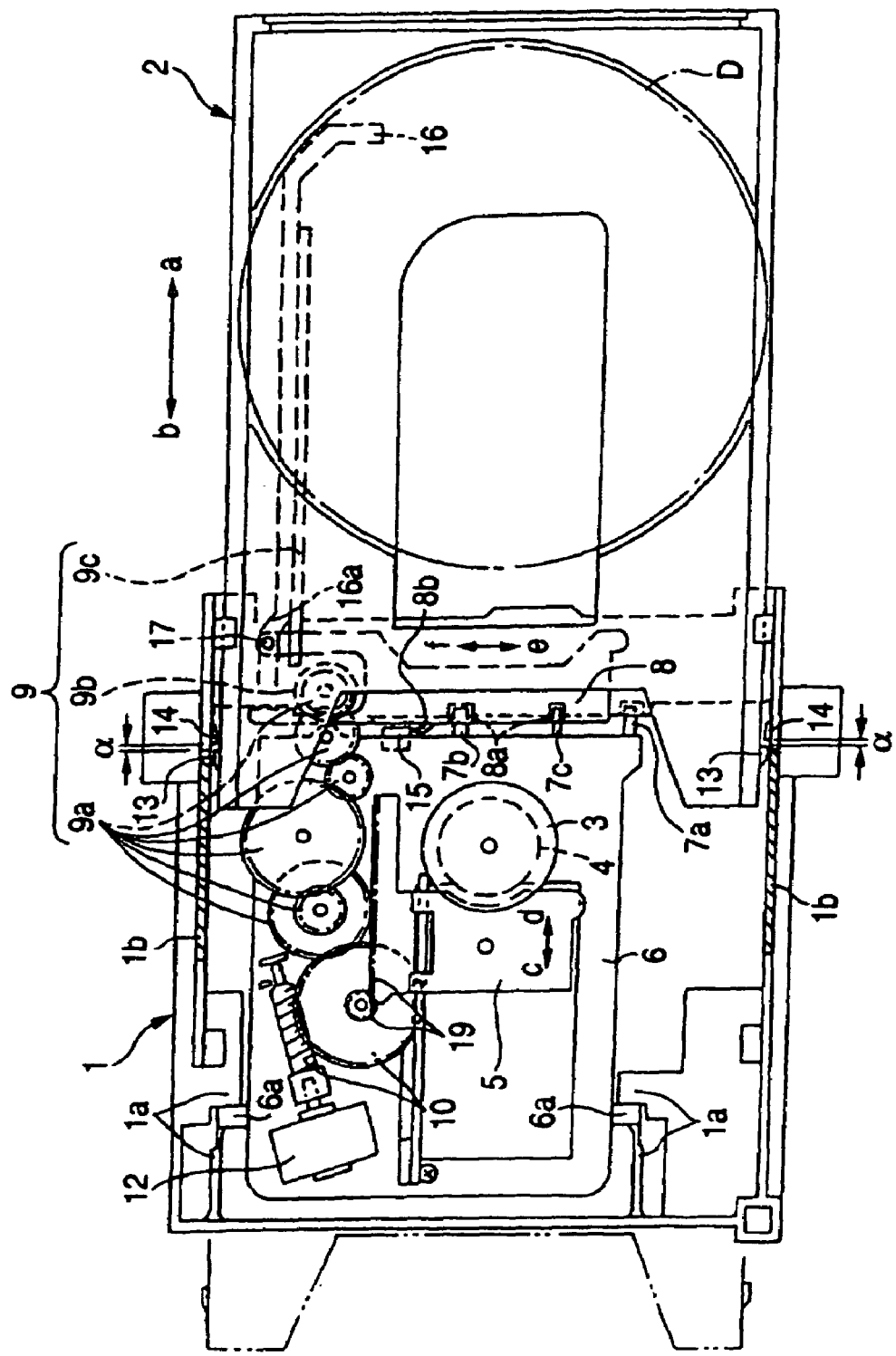
FIG. 7 is a schematic plan view illustrating a conventional example.
Figure 8:
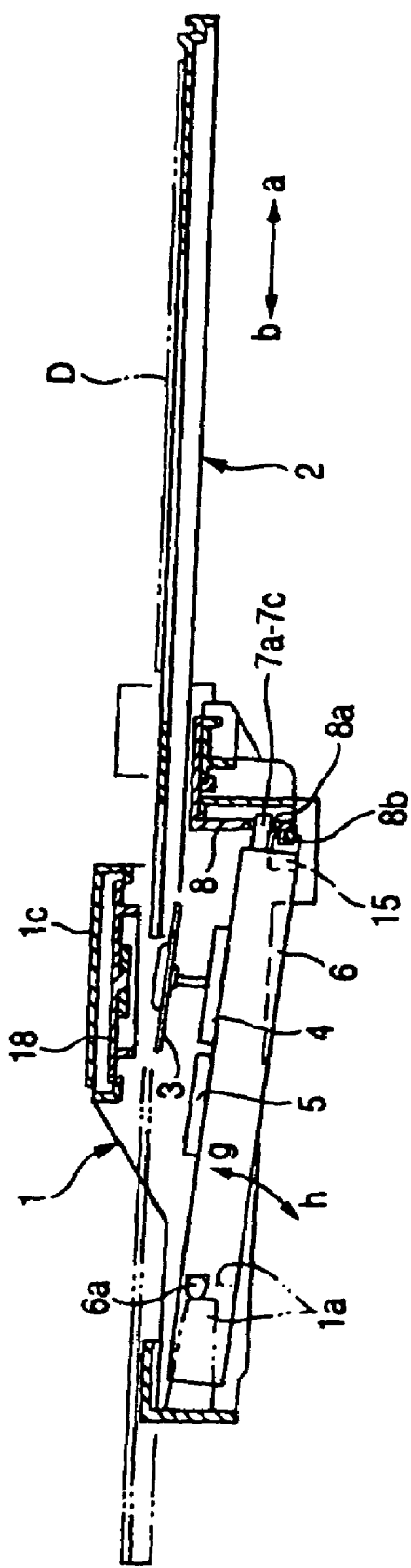
FIG. 8 is a longitudinal sectional view of the conventional example.
Figure 9A:
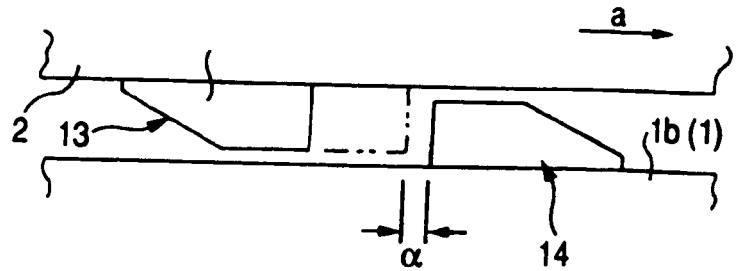
FIG. 9A is a plan view of a main part of the conventional example in a state where a tray is moving forward.
Figure 9B:
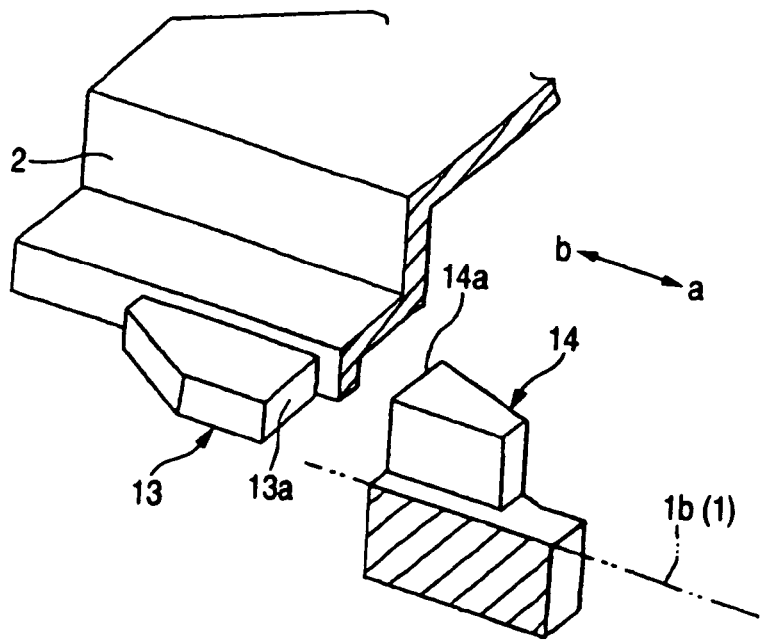
FIG. 9B is an exploded perspective view of the main part.
Figure 9C:
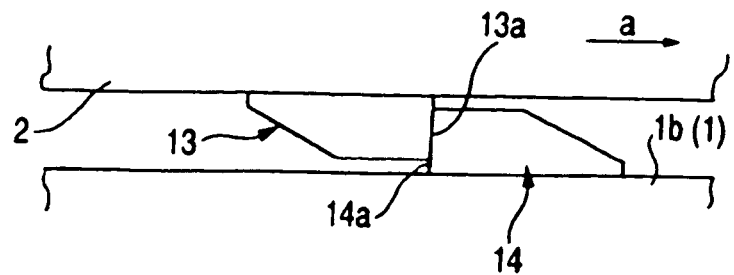
FIG. 9C is a plan view of a main part of a modified example.

FIGS. 1 and 2 show a disk player according to a first embodiment of the invention, in which the conventional tray detector 15 (refer to FIG. 7) is omitted, each dislocation preventive piece 14 has an elastic plate 21 that can be displaced elastically and which extends rearward diagonally so as to approach a tray 2 side, and an inclined guide surface 22 is formed at a front end face of each projecting piece 13 in such a manner as to incline rearward (b) so as to approach the tray 2 side. In addition, a stopper surface 23, whose thickness is the same as the thickness t of the elastic plate 21 or a transverse width T which is slightly larger than the thickness t, is formed between a deeper end of the inclined guide surface 22 and the tray 2, and when the tray 2 is moved forward (a) by a feed motor 12 via a gear mechanism 9, the feed motor 12 is driven only for a certain period of time (for example, 2 to 5 seconds) through timer control. Since the arrangement of the other constituent components than those described above are the same as those of the construction shown in FIGS. 7 and 8, the description thereof will be omitted by giving like reference numerals to like components to those of the construction shown in FIGS. 7 and 8.

The elastic plate 21 has the thickness t of 0.8 to 2.0 mm.

To describe a procedure for an ejecting operation, the mode of the disk player is changed over from a play mode to an eject mode, and the feed motor 12 is driven only for the certain period of time (for example, 2 to 5 seconds) so as to move forward (a) the tray 2 accommodated in a housing 1, so that the inclined guide surface 22 on each projecting piece 13 is brought into contact with a distal end of the elastic plate 21 on each dislocation preventive piece (refer to temporary lines in FIG. 2A), whereby the elastic plate 21 is displaced elastically along the inclined guide surface 22 to thereby apply the brakes to stop the tray 2 which is moving forward and the tray 2 is stopped at its front-most position (a) by allowing the stopper surface 23 to be brought into abutment with the distal end of the elastic plate 21.

According to the construction described above, the feed motor 12 is designed to be driven only for the certain period of time through timer control so as to drive the tray 2 forward (a), and since this obviates the necessity of the conventional components such as the tray detector 15 and the printed circuit board and lead wires which are necessary to control the tray detector 15, the production costs can be reduced.

Since the forward movement a of the tray 2 is disturbed by allowing the inclined guide surface 22 on each projecting piece 13 to be brought into contact with the distal end of the elastic plate 21 on each dislocation preventive piece just before the tray 2 is stepped at its front-most (a) position, the impact resulting from the contact is dampened to thereby reduce the contact noise, and hence there is no risk that the conventional uncomfortable collision noise is generated. In addition, the problematic occurrence of a failure due to the excessively large load being applied to the driving system such as the feed motor 12 can also be resolved. Furthermore, the tray 2 can be stopped at its front-most (a) position in the predetermined way by allowing the stopper surface 23 on each projecting piece 13 to be brought into abutment with the distal end of the elastic plate 21.

Here, in particular, since the inclined guide surface 22 is inclined rearward so as to approach the tray 2 side and the distal end of the elastic plate 21 bites into a substantially V-shaped recessed portion 24 formed between the inclined guide surface 22 and the tray 2, it is ensured that the tray 2 can be stopped at its front-most (a) position.

Figure 3A:
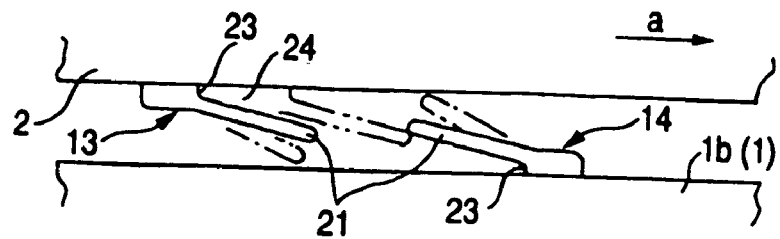
FIG. 3A is a plan view of a main part of a disk player according to a second embodiment of the invention in a state where a tray is moving.
Figure 3B:
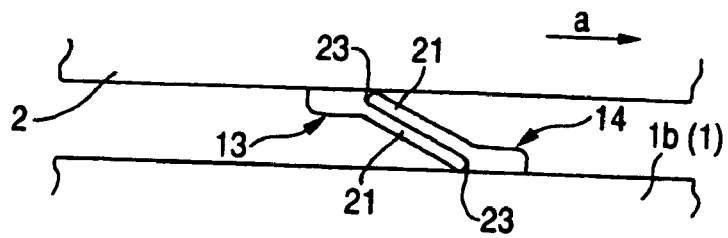
FIG. 3B is a plan view of the main part in a state where the tray is at its front-most position.
Figure 3C:
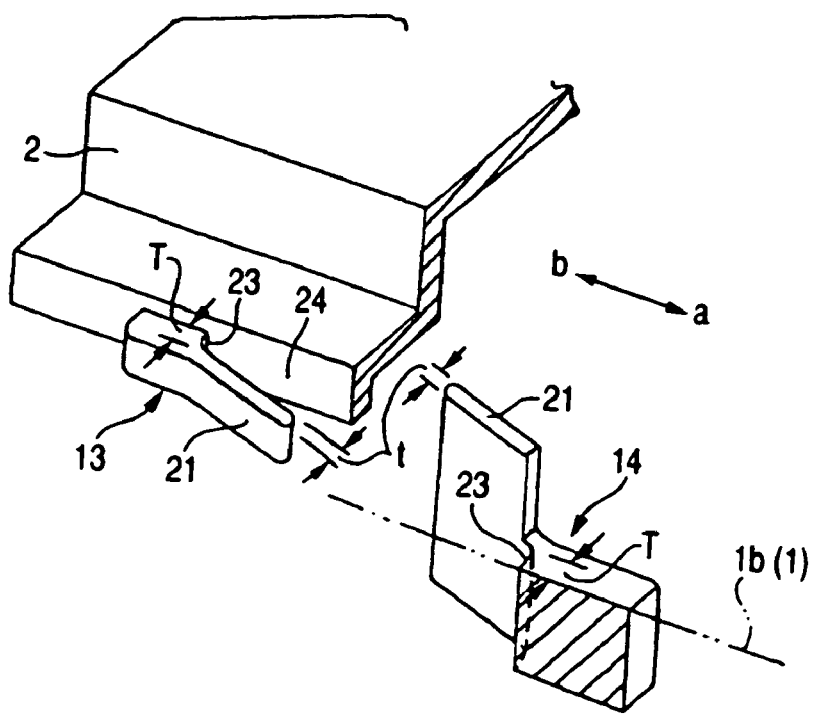
FIG. 3C is an exploded perspective view of the main part.

FIG. 3 illustrates a disk player according to a second embodiment of the invention, in which each projecting piece 13 and each dislocation preventive piece 14 have elastic plates 21 that can be displaced elastically and which face each other, and a stopper surface 23 is formed both between a root of the elastic plate 21 on the projecting piece side and the tray and between a root of the elastic plate on the dislocation preventive piece side (or either between a root of the elastic plate 21 on the projecting piece side and the tray or between a root of the elastic plate on the dislocation preventive piece side). When a feed motor 12 is driven only for a certain period of time so as to drive forward (a) the tray 2 accommodated in a housing 1, the elastic plates are brought into contact with each other at distal ends thereof (refer to temporary lines in FIG. 3A), so that the respective elastic plates are elastically displaced by each other to thereby apply the brakes to stop the tray 2 which is moving forward (a), whereby the stopper surface 23 is brought into abutment with the distal end of the elastic plate 21 to thereby stop the tray at its front-most position (refer to FIG. 3B). Since the arrangement of the other constituent components than those described above are the same as those of the first embodiment shown in FIGS. 1 and 2, the description thereof will be omitted by giving like reference numerals to like components to those of the first embodiment shown in FIGS. 1 and 2.

According to the construction described above, an advantage similar to that of the first embodiment can be obtained, and in particular, since by bringing the distal ends of the elastic plates 21 which make up the projecting piece 13 and the dislocation preventive piece 14, respectively, with each other, the respective elastic plates can be displaced elastically by each other, the impact resulting from the contact can be dampened more effectively to thereby reduce the contact noise to an extremely low level. In addition, since the distal end of the elastic plate 21 bites into a substantially V-shaped recessed portion formed between the elastic plate 21 on the projecting piece side and the tray 2, it is ensured that the tray can be stopped at its front-most position.

Figure 4A:
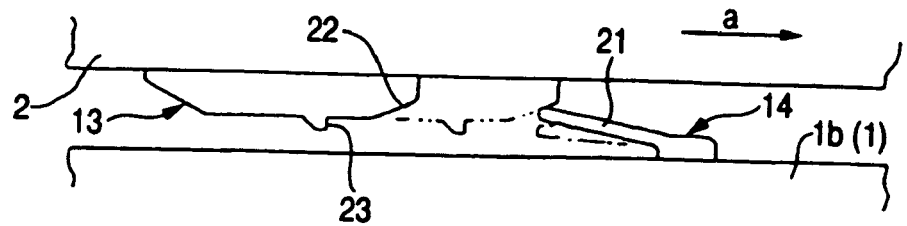
FIG. 4A is a plan view of a main part of a disk player according to a third embodiment of the invention in a state where a tray is moving.
Figure 4B:
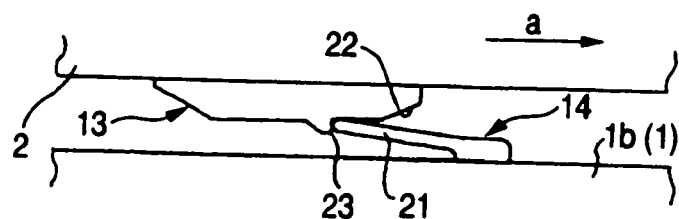
FIG. 4B is a plan view of the main part in a state where the tray is at its front-most position.
Figure 4C:
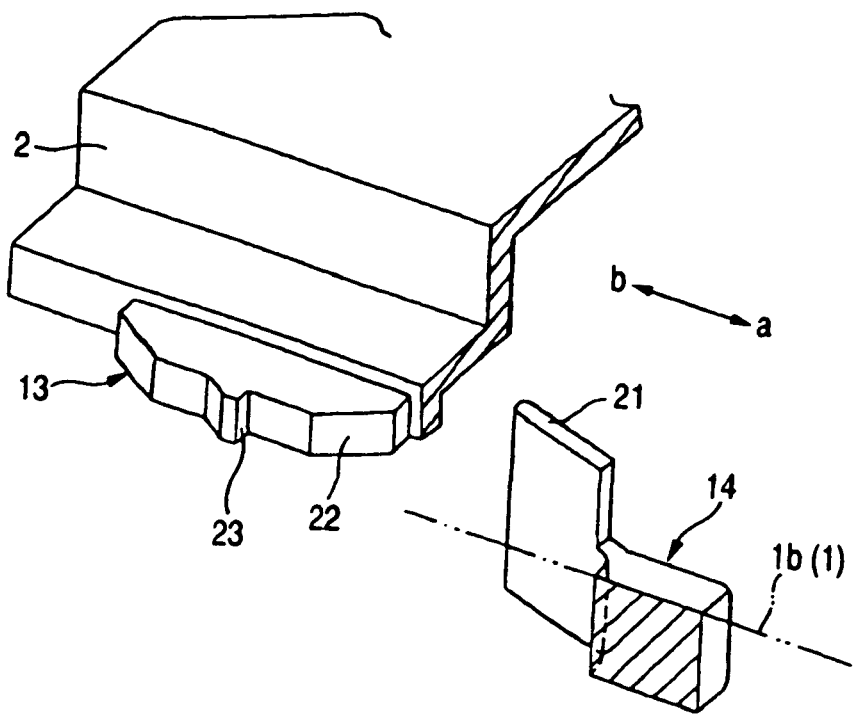
FIG. 4C is an exploded perspective view of the main part.

FIG. 4 illustrates a disk player according to a third embodiment of the invention, in which an inclined guide surface 22 is formed at a front end of a side of each projecting piece 13 in such a manner as to incline forward (a) so as to approach a tray 2 side, a stopper surface 23 is formed on the side of each projecting piece 13 rearward of the inclined guide surface 22 in such a manner as to bend substantially at right angles to extend sideways, and the dislocation preventive piece 14 has an elastic plate 21 that can be displaced elastically and which extends rearward diagonally so as to approach the tray 2 side. When a feed motor 12 is drive only for a predetermined period of time through timer control to drive forward (a) the tray 2 accommodated in a housing 1, the inclined guide surface 22 on each projecting piece 13 is brought into contact with a distal end of the elastic plate 21 on each dislocation preventive piece (refer temporary lines in FIG. 4A), so that the elastic plate is displaced elastically along the inclined guide surface 22 to thereby apply the brakes to stop the tray 2 which is moving forward (a), whereby the tray 2 is stopped at its front-most (a) position by allowing the stopper surface 23 to be brought into abutment with the distal end of the elastic plate (refer to FIG. 4B). Since the arrangement of the other constituent components than those described above are the same as those of the first embodiment shown in FIGS. 1 and 2, the description thereof will be omitted by giving like reference numerals to like components to those of the first embodiment shown in FIGS. 1 and 2.

According to the construction described above, an advantage similar to that of the first embodiment can be obtained, and in particular, the elastic plate 21 of each dislocation preventive piece is forced to expand by the inclined guide surface 22 of each projecting piece 13 so as to displace the elastic plate elastically to thereby apply the brakes to stop the tray 2 which is moving forward (a) in an ensured fashion by virtue of elastic force generated by the elastic displacement.

Figure 5A:
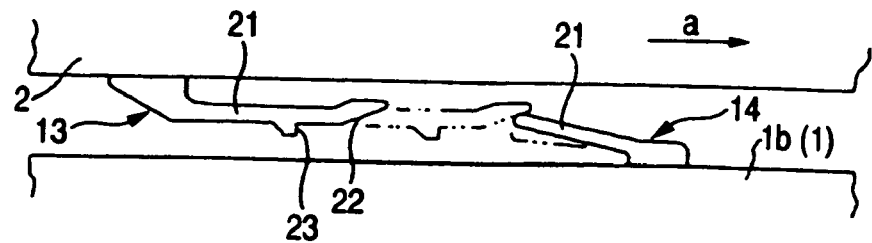
FIG. 5A is a plan view of a main part of a disk player according to a fourth embodiment of the invention in a state where a tray is moving.
Figure 5B:
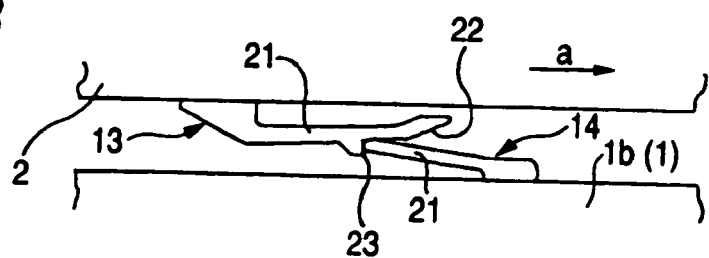
FIG. 5B is a plan view of the main part in a state where the tray is at its front-most position.
Figure 5C:
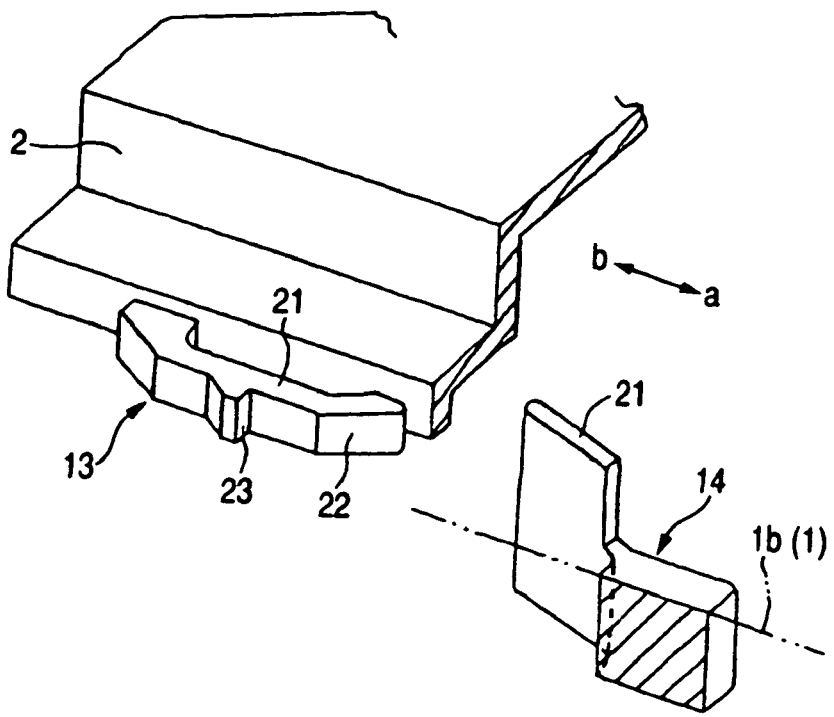
FIG. 5C is an exploded perspective view of the main part.

FIG. 5 illustrates a disk player according to a fourth embodiment of the invention, in which each projecting piece 13 has an elastic plate 21 that can be displaced elastically and which extends forward (a), an inclined guide surface 22 is formed at a front end of a side of the elastic plate 21 in such a manner as to incline forward (a) so as to approach a tray side, a stopper surface 23 is formed on the side of the elastic plate 21 rearward (b) of the inclined guide surface 22 in such a manner as to bend substantially at right angles so as to extend sideways, and each dislocation preventive piece 14 has an elastic plate 21 that can be displaced elastically and which extends rearward (b) diagonally so as to approach the tray 2 side. When a feed motor 12 is driven only for a certain period of time through timer control so as to drive forward (a) a tray 2 accommodated in a housing 1, the inclined guide surface 22 on the elastic plate 21 of each projecting piece is brought into abutment with a distal end of the elastic plate 21 of each dislocation preventive piece (refer to temporary lines in FIG. 5A), so that the respective elastic plates 21 are displaced elastically by each other to thereby apply the brakes to stop the tray 2 which is moving forward (a), whereby the tray 2 is stopped at its front-most (a) position (refer to FIG. 5B). Since the arrangement of the other constituent components than those described above are the same as those of the first embodiment shown in FIGS. 1 and 2, the description thereof will be omitted by giving like reference numerals to like components to those of the first embodiment shown in FIGS. 1 and 2.

According to the construction described above, an advantage similar to that of the first embodiment can be obtained, and in particular, since by forcibly separating the elastic plate 21 of each dislocation preventive piece by the inclined guide surface 22 formed on the elastic plate 21 of each projecting piece, it is ensured that brakes are applied to stop the tray 2 which is moving forward (a) and the respective elastic plates 21 are displaced elastically by each other, the impact resulting from the contact can be dampened more effectively, and the contact noise can be reduced to an extremely low level.

Figure 6A:
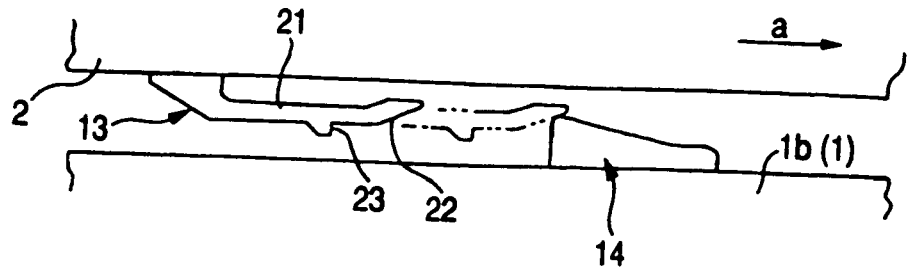
FIG. 6A is a plan view of a main part of a disk player according to a fifth embodiment of the invention in a state where a tray is moving.
Figure 6B:
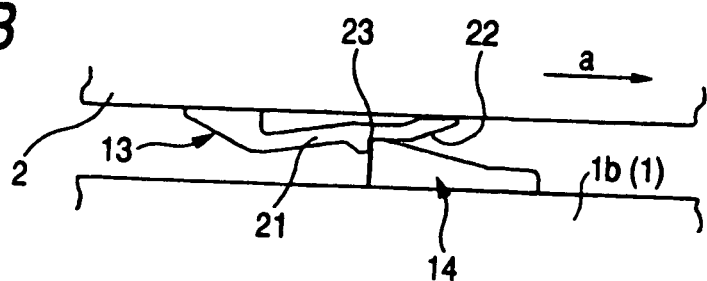
FIG. 6B is a plan view of the main part in a state where the tray is at its front-most position.
Figure 6C:
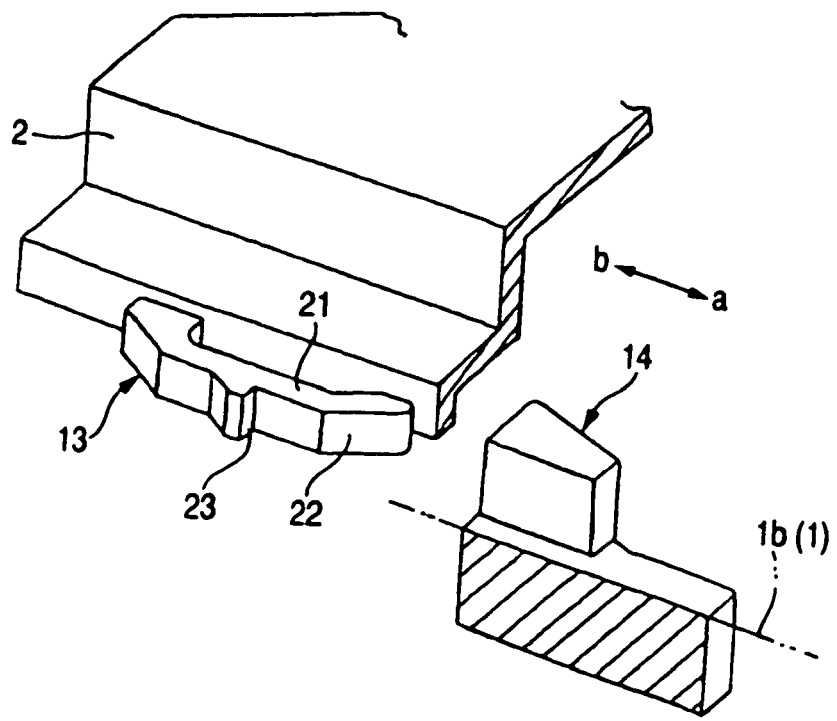
FIG. 6C is an exploded perspective view of the main part.

FIG. 6 illustrates a disk player according to a fifth embodiment of the invention, in which each projecting piece 13 has an elastic plate 21 that can be displaced elastically and which extends forward (a), an inclined guide surface 22 is formed on a side of the elastic plate 21 in such a manner as to incline forward (a) so as to approach a tray 2 side, and a stopper surface 23 is formed on the side of the elastic plate 21 rearward (b) of the inclined guide surface 22 in such a manner as to bend substantially at right angles so as to extend sideways. When a feed motor 12 is driven only for a certain period of time through timer control so as to drive forward (a) a tray 2 accommodated in a housing 1, the inclined guide surface 22 of the elastic plate 21 of each projecting piece is brought into contact with each dislocation preventive piece 14 (refer to temporary lines in FIG. 6A), so that the elastic plate 21 is displaced elastically to thereby apply the brakes to stop the tray 2 which is moving forward (a), whereby the tray 2 is stopped at its front-mode (a) position by allowing the stopper surface 23 to be brought into abutment with the dislocation preventive piece 14 (refer to FIG. 6B). Since the arrangement of the other constituent components than those described above are the same as those of the first embodiment shown in FIGS. 1 and 2, the description thereof will be omitted by giving like reference numerals to like components to those of the first embodiment shown in FIGS. 1 and 2.

According to the construction described above, an advantage similar to that of the first embodiment can be obtained, and in particular, the elastic plate 21 is displaced elastically by forcing the inclined guide surface 22 formed on the elastic plate 21 of each projecting piece into between both the dislocation preventive pieces 14 to thereby apply the brakes to stop the tray 2 which is moving forward (a) by virtue of elastic force generated by the elastic displacement.

Figure 10:
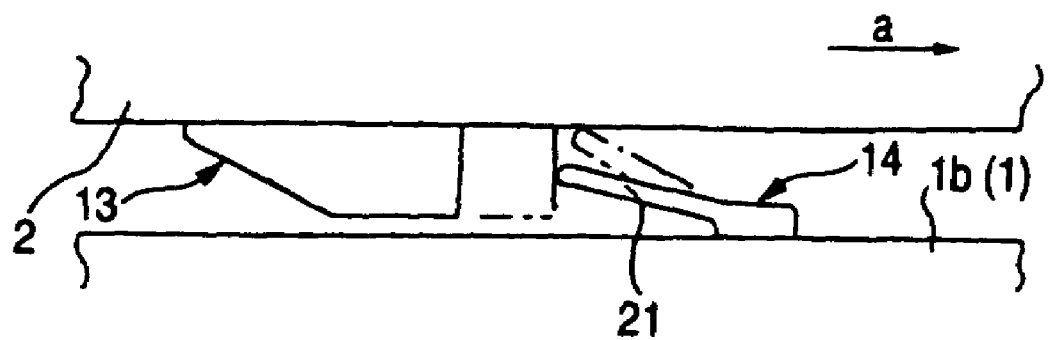
FIG. 10 is a plan view of a main part of a modified example.

Incidentally, a disk player according to the present invention may be constructed as shown in FIG. 10. That is, each projecting piece 13 may have a flat front face against which an elastic plate 21 provided on the housing 1 abuts.

What is claimed is:

1. A disk player comprising:
    a housing;
    a motor disposed in the housing;
    a disk tray being movable forward and backward by the motor, the disk tray having a projecting piece at a rear end on each side edge thereof, each of the projecting pieces having an inclined guide surface on a front end face thereof in such a manner as to incline backward toward the disk tray, and a stopper surface formed between a backward end of the inclined guide surface and the disk tray; and
    dislocation preventive pieces disposed at a front end side of the housing and projecting from the housing so as to respectively face the projecting pieces, each of the dislocation preventive piece having an elastic plate being elastically displaceable and extending backward diagonally so as to approach to the disk tray;
    wherein when the motor is driven for a certain period of time through timer control to move forward the disk tray accommodated in the housing, the inclined guide surface on each of the projecting pieces is brought into contact with a distal end of the elastic plate of each of the dislocation preventive pieces so as to displace elastically the elastic plate along the inclined guide surface to thereby slow the disk tray that is moving forward and then the stopper surface on each of the projecting pieces is brought into abutment with the distal end of the elastic plate of each of the dislocation preventive pieces to thereby stop the disk tray at its front-most position.

* * * * *